(12) United States Patent
Pajukoski

(10) Patent No.: US 7,940,857 B2
(45) Date of Patent: May 10, 2011

(54) METHOD FOR LIMITING SIGNAL AND TRANSMITTER

(75) Inventor: Kari Pajukoski, Oulu (FI)

(73) Assignee: Nokia Corporation, Espoo (FI)

( * ) Notice: Subject to any disclaimer, the term of this patent is extended or adjusted under 35 U.S.C. 154(b) by 1381 days.

(21) Appl. No.: 10/511,759

(22) PCT Filed: Apr. 29, 2003

(86) PCT No.: PCT/FI03/00337
§ 371 (c)(1),
(2), (4) Date: Apr. 30, 2002

(87) PCT Pub. No.: WO03/094379
PCT Pub. Date: Nov. 13, 2003

(65) Prior Publication Data
US 2005/0185736 A1 Aug. 25, 2005

(30) Foreign Application Priority Data
Apr. 30, 2002 (FI) ..................... 20020820

(51) Int. Cl.
*H04K 1/02* (2006.01)
(52) U.S. Cl. ..................... 375/296
(58) Field of Classification Search .......... 375/146, 375/296; 327/309–311
See application file for complete search history.

(56) References Cited

U.S. PATENT DOCUMENTS

| | | | | |
|---|---|---|---|---|
| 5,602,833 A * | 2/1997 | Zehavi | .......... | 370/209 |
| 5,727,026 A * | 3/1998 | Beukema | .......... | 375/296 |
| 5,751,705 A * | 5/1998 | Sato | .......... | 370/335 |
| 6,125,103 A * | 9/2000 | Bauml et al. | .......... | 370/203 |
| 6,144,694 A * | 11/2000 | Uta et al. | .......... | 375/146 |
| 6,246,286 B1 * | 6/2001 | Persson | .......... | 330/149 |
| 6,418,173 B1 * | 7/2002 | Matsuoka et al. | .......... | 375/297 |
| 6,628,605 B1 * | 9/2003 | Chang | .......... | 370/208 |
| 6,636,555 B1 * | 10/2003 | Frank et al. | .......... | 375/146 |
| 6,687,511 B2 * | 2/2004 | McGowan et al. | .......... | 455/522 |
| 6,701,163 B1 * | 3/2004 | Hiramatsu | .......... | 455/561 |
| 6,711,217 B1 * | 3/2004 | Jeong | .......... | 375/297 |
| 7,031,334 B1 * | 4/2006 | Nikula et al. | .......... | 370/442 |
| 7,110,434 B2 * | 9/2006 | Currivan et al. | .......... | 375/144 |
| 2002/0012403 A1 * | 1/2002 | McGowan et al. | .......... | 375/295 |
| 2002/0042253 A1 * | 4/2002 | Dartois | .......... | 455/127 |
| 2002/0114270 A1 * | 8/2002 | Pierzga et al. | .......... | 370/208 |
| 2002/0196876 A1 * | 12/2002 | Takada | .......... | 375/346 |
| 2003/0001669 A1 * | 1/2003 | Billsberry | .......... | 330/52 |

(Continued)

FOREIGN PATENT DOCUMENTS

| | | |
|---|---|---|
| EP | 0940925 A1 | 9/1999 |
| EP | 0993136 A1 | 4/2000 |
| EP | 1085670 A2 | 3/2001 |
| EP | 1091516 A1 | 4/2001 |
| WO | WO 99/63723 A1 | 12/1999 |

*Primary Examiner* — David C. Payne
*Assistant Examiner* — Leon-Viet Q Nguyen
(74) *Attorney, Agent, or Firm* — Squire, Sanders & Dempsey (US) LLP

(57) ABSTRACT

The invention relates to a method and a transmitter for limiting a signal at chip level. The transmitter limiting the signal at chip level comprises means (704) for determining a limiting signal from a transmissible signal filtered using a pulse shaping filter, the transmitter comprises means (704, 710, 712) for determining an error signal using the transmissible signal and the limiting signal, the transmitter comprises means (720) for generating a limited transmissible signal by reducing the error signal filtered using the filter matched to a chip pulse waveform from the transmissible signal and the transmitter comprises means (722, 724) for filtering the limited transmissible signal using the pulse shaping filter.

41 Claims, 7 Drawing Sheets

U.S. PATENT DOCUMENTS

Figure 1:
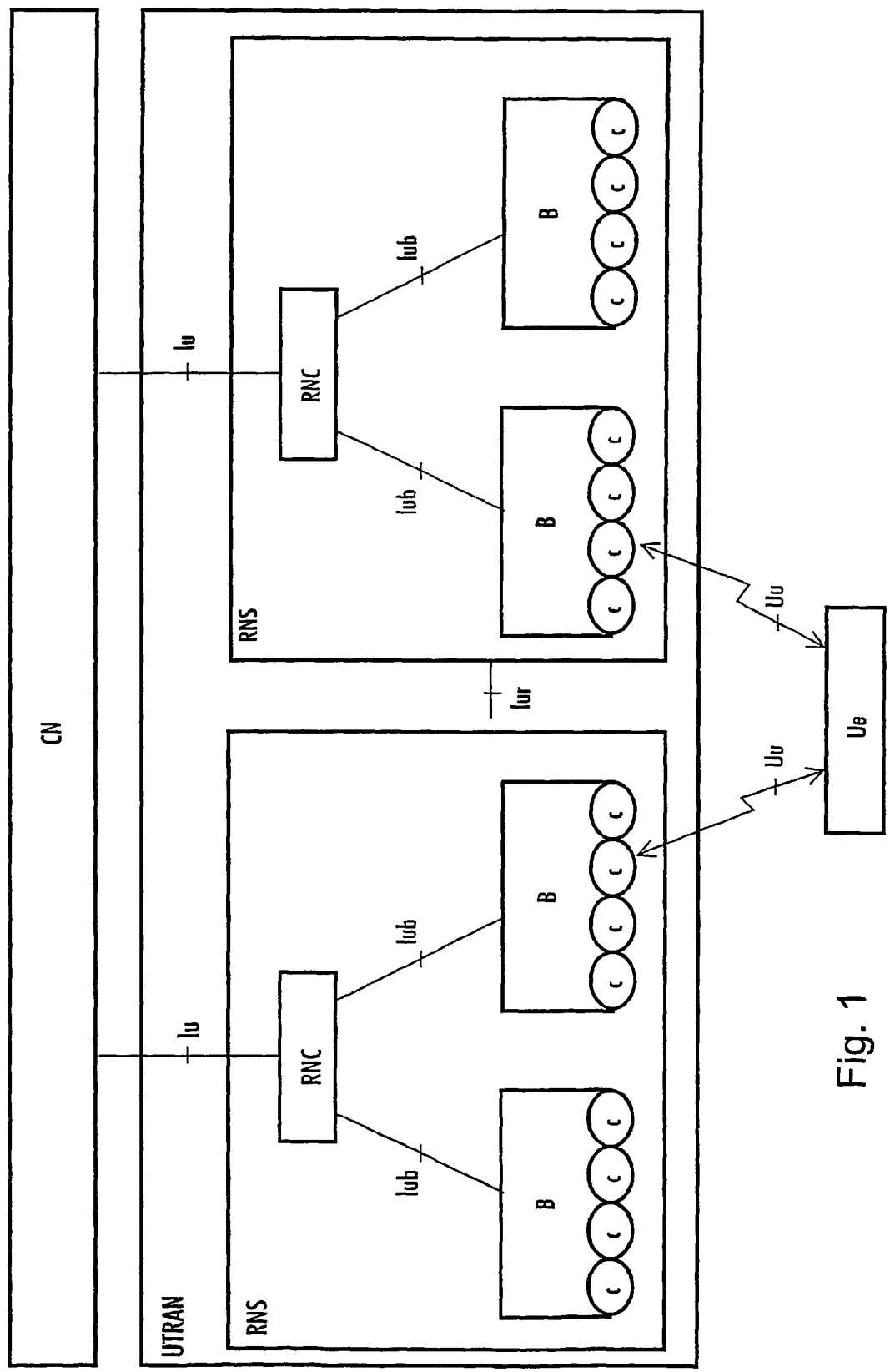

| | | | |
|---|---|---|---|
| 2003/0026351 A1* | 2/2003 | Hunton | 375/295 |
| 2003/0063682 A1* | 4/2003 | Shearer, III | 375/295 |
| 2003/0067995 A1* | 4/2003 | Matsuoka et al. | 375/296 |
| 2003/0185174 A1* | 10/2003 | Currivan et al. | 370/335 |
| 2003/0219079 A1* | 11/2003 | Piirainen et al. | 375/296 |
| 2005/0213691 A1* | 9/2005 | Ozluturk et al. | 375/343 |
| 2005/0232373 A1* | 10/2005 | Peeters | 375/296 |
| 2006/0146924 A1* | 7/2006 | Smith et al. | 375/226 |

* cited by examiner

METHOD FOR LIMITING SIGNAL AND TRANSMITTER

FIELD

The invention relates to a method for limiting power or amplitude values of a signal in a transmitter at chip level, and a transmitter.

BACKGROUND

In several data transmission systems, the linearity of a power amplifier limits the obtainable maximum transmission power, especially when the Peak-to-Average Ratio of a transmissible signal is high. In such a case, high power or amplitude values may temporarily occur in a signal to be fed into the power amplifier that have to be taken into account when the power amplifier is being dimensioned. In practice, this means that the input signal of the amplifier must be scaled to a lower power or amplitude level in order to fulfil the spectrum requirements of the data transmission system in use. What this method, referred to as back off, provides is that a signal to be amplified is located within an area, where the transmission function of the amplifier is more linear. However, a problem arises, since back off reduces the efficiency of the amplifier and/or the transmitter. Then again, the power amplifiers having a broad linear operating range are expensive and the efficiency thereof is very poor.

Different limiting, or clipping, methods concerning the power or amplitude values of signals have been developed in the background art. However, the prior art methods generally alter the signal in such a manner that in code division multiple access systems the orthogonality of different user-specific codes is no longer maintained. Occasionally the power or amplitude of transmission cannot be limited in practice in order for the detection in the receiver of the subscriber device to be successful, since a multilevel modulation method is used, in which the symbols are placed so close to one another in a signal space diagram that even the slightest increase in noise causes an error in the detection. The clipping should therefore be focused on those transmissions only that can be clipped. Examples of systems that cannot endure signal clipping are the 3GPP ($3^{rd}$ Generation Partnership Project) and the HSDPA (High Speed Downlink Packet Access) studied by the standardization forum.

BRIEF DESCRIPTION

According to one aspect of the invention, there is provided a method for limiting a signal in a transmitter at chip level, the method comprising: determining a limiting signal from a transmissible signal filtered using a pulse shaping filter, determining an error signal using the transmissible signal and the limiting signal, generating a limited transmissible signal by reducing an error signal filtered using the filter matched to a chip pulse waveform from the transmissible signal.

According to another aspect of the invention, there is provided a method for limiting a signal in a transmitter at chip level, the method comprising: determining a limiting signal from a transmissible signal filtered using a pulse shaping filter, determining an error signal using the transmissible signal and the limiting signal, orthogonalizing the error signal filtered using the filter matched to a chip pulse waveform, generating a limited transmissible signal by reducing the orthogonalized error signal from the transmissible signal.

According to another aspect of the invention, there is provided a method for limiting a signal in a transmitter at chip level, the method comprising: combining at least two signals modulated on different carriers to a combination signal, determining a limiting signal from the combination signal filtered using a pulse shaping filter, determining an error signal using the combination signal and the limiting signal, dividing the error signal onto different carriers in a predetermined manner, generating limited transmissible signals by reducing each error signal part filtered using the filter matched to a chip pulse waveform from a corresponding transmissible signal.

According to another aspect of the invention, there is provided a transmitter limiting a signal at chip level, the transmitter comprising: means for determining a limiting signal from a transmissible signal filtered using a pulse shaping filter, means for determining an error signal using the transmissible signal and the limiting signal, comprises means for generating a limited transmissible signal by reducing the error signal filtered using the filter matched to a chip pulse waveform from the transmissible signal, means for filtering the limited transmissible signal using the pulse shaping filter.

According to another aspect of the invention, there is provided a transmitter limiting a signal at chip level, the transmitter comprising: means for determining a first limiting signal from a transmissible signal filtered using a pulse shaping filter, means for determining a first error signal using the transmissible signal and the first limiting signal, means for orthogonalizing the first error signal filtered using the filter matched to a chip pulse waveform, means for generating a first limited transmissible signal by reducing the orthogonalized first error signal from the transmissible signal, means for determining a second limiting signal from the first limited transmissible signal filtered using the pulse shaping filter, means for determining a second error signal using the first limited transmissible signal and the second limiting signal, means for generating a second limited transmissible signal by reducing the second error signal filtered using the filter matched to a chip pulse waveform from the transmissible signal, means for filtering the second limited transmissible signal using the pulse shaping filter.

According to another aspect of the invention, there is provided a transmitter limiting a signal at chip level, the transmitter comprising: means for combining at least two signals modulated on different carriers to a combination signal, means for determining a limiting signal from the combination signal filtered using a pulse shaping filter, means for determining an error signal using the combination signal and the limiting signal, means for dividing the error signal onto different carriers in a predetermined manner, means for generating limited transmissible signals by reducing each error signal part filtered using the filter matched to a chip pulse waveform from a corresponding transmissible signal, means for filtering the limited transmissible signals using the pulse shaping filter, means for generating a combined limited transmissible signal by combining the filtered limited transmissible signals.

According to another aspect of the invention, there is provided a transmitter limiting a signal at chip level, the transmitter being configured to: determine a limiting signal from a transmissible signal filtered using a pulse shaping filter, determine an error signal using the transmissible signal and the limiting signal, generate a limited transmissible signal by reducing the error signal filtered using the filter matched to a chip pulse waveform from the transmissible signal, filter the limited transmissible signal using the pulse shaping filter.

According to another aspect of the invention, there is provided a transmitter limiting a signal at chip level, the transmitter being configured to: determine a first limiting signal from a transmissible signal filtered using a pulse shaping filter, determine a first error signal using the transmissible signal and the first limiting signal, orthogonalize the first error signal filtered using the filter matched to a chip pulse waveform, generate a first limited transmissible signal by reducing the orthogonalized first error signal from the transmissible signal, determine a second limiting signal from the first limited transmissible signal filtered using the pulse shaping filter, determine a second error signal using the first limited transmissible signal and the second limiting signal, generate a second limited transmissible signal by reducing the second error signal filtered using the filter matched to a chip pulse waveform from the transmissible signal, filter the second limited transmissible signal using the pulse shaping filter.

According to another aspect of the invention, there is provided a transmitter limiting a signal at chip level, the transmitter being configured to: combine at least two signals modulated on different carriers to a combination signal, determine a limiting signal from the combination signal filtered using a pulse shaping filter, determine an error signal using the combination signal and the limiting signal, divide the error signal onto different carriers in a predetermined manner, generate limited transmissible signals by reducing each error signal part filtered using the filter matched to a chip pulse waveform from a corresponding transmissible signal, filter the limited transmissible signals using the pulse shaping filter, generate a combined limited transmissible signal by combining the filtered limited transmissible signals.

According to another aspect of the invention, there is provided a transmitter limiting a signal at chip level, the transmitter being configured to: filter transmissible signals modulated on different carriers using pulse shaping filters, combine at least two filtered signals to a combination signal, determine a limiting signal from the combination signal, determine an error signal using the combination signal and the limiting signal, divide the error signal onto different carriers in a predetermined manner, generate limited transmissible signals by reducing each error signal part filtered using the filter matched to a chip pulse waveform from a corresponding transmissible signal, filter the limited transmissible signals using the pulse shaping filter, generate a combined limited transmissible signal by combining the filtered limited transmissible signals.

The preferred embodiments of the invention are disclosed in the dependent claims.

The invention is based on the idea that an error signal to be used for limiting is determined from a signal filtered using a pulse shaping filter, the error signal is filtered using a filter matched to a chip pulse waveform and the filtered error signal is reduced from a delayed transmissible signal. The limited transmissible signal thus obtained is filtered using the pulse shaping filter. In the second embodiment of the invention, signals are also orthogonalized and the third embodiment is applicable to be used in multiple carrier systems. What is typical for all preferred embodiments of the invention is that the need to limit a signal is determined from a signal filtered using the pulse shaping filter, but a signal to be clipped is a signal that is not filtered using the pulse shaping filter.

The method and transmitter according to the invention provide several advantages. The method of the invention allows reducing the Peak-to-Average ratio. In addition, since the limited transmissible signal is filtered using the pulse shaping filter, the spread of the signal spectrum to other bands caused by limiting the power or amplitude values will be compensated. Since the need to limit the signal is determined from a signal filtered using the pulse shaping filter, whereby the effect of the pulse shaping filter is considered, the limitation of the signal becomes more efficient than if the limitation need was determined from a non-filtered signal.

LIST OF DRAWINGS

Figure 2:
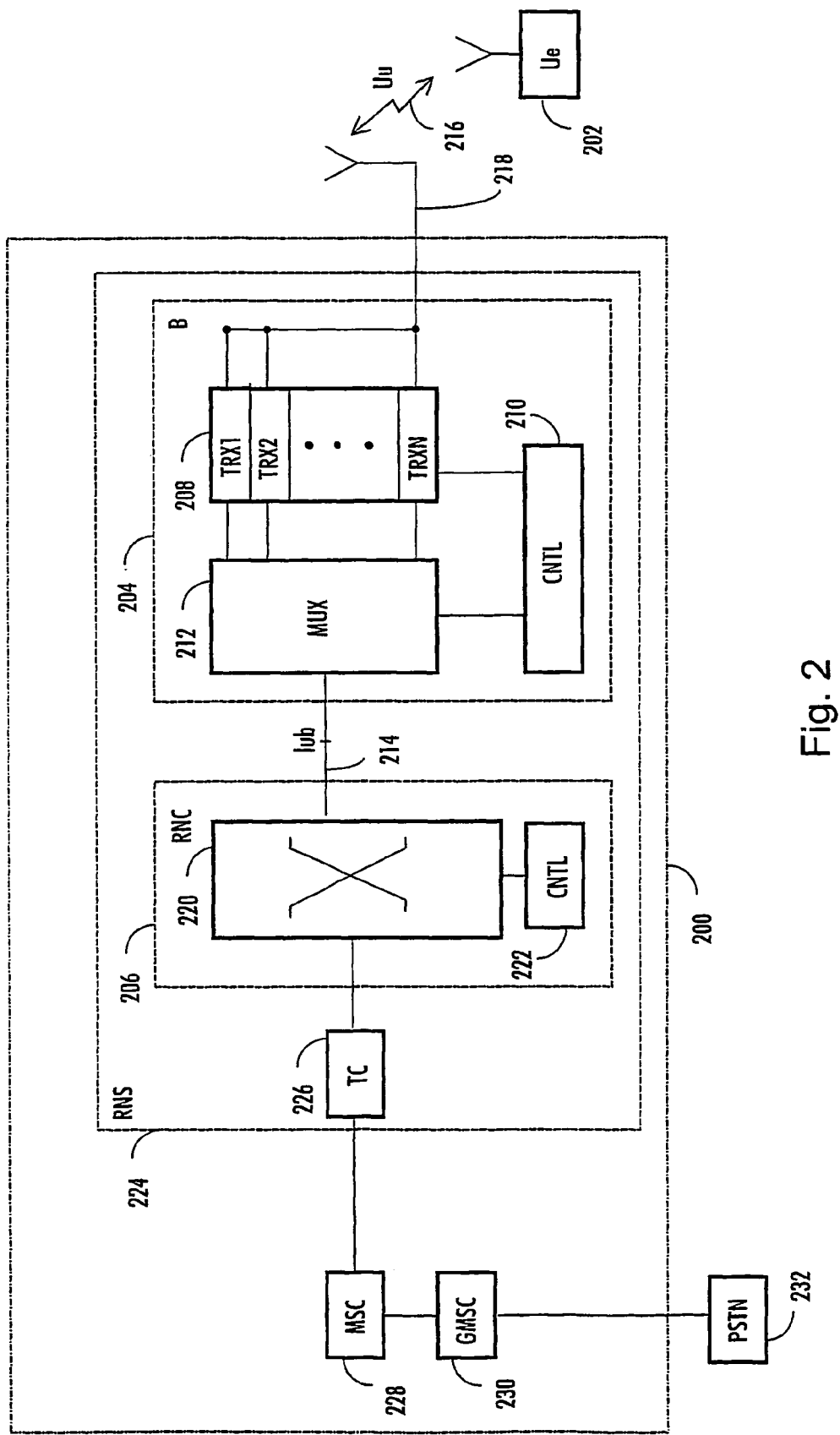
Figure 4:
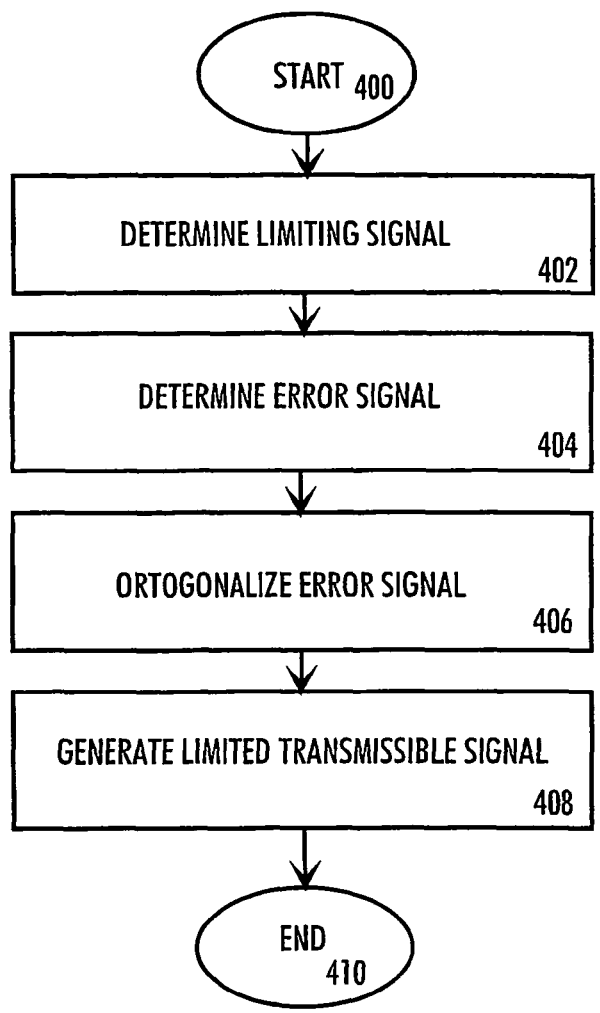
Figure 3:
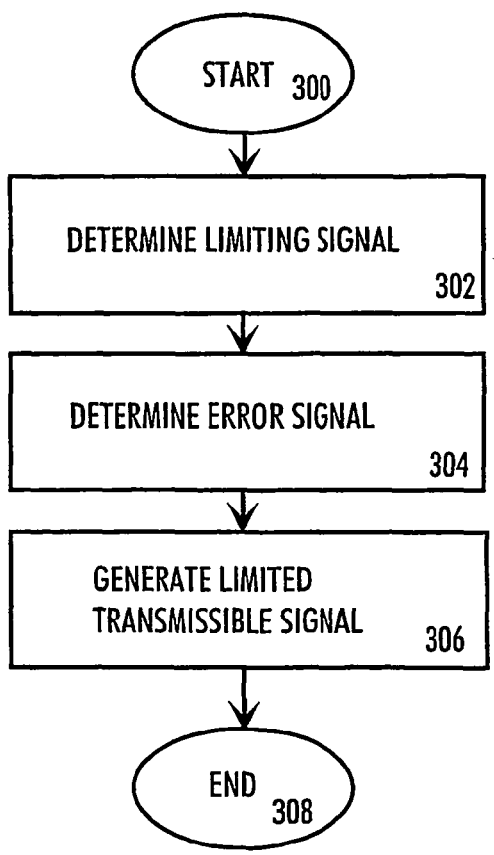
Figure 5:
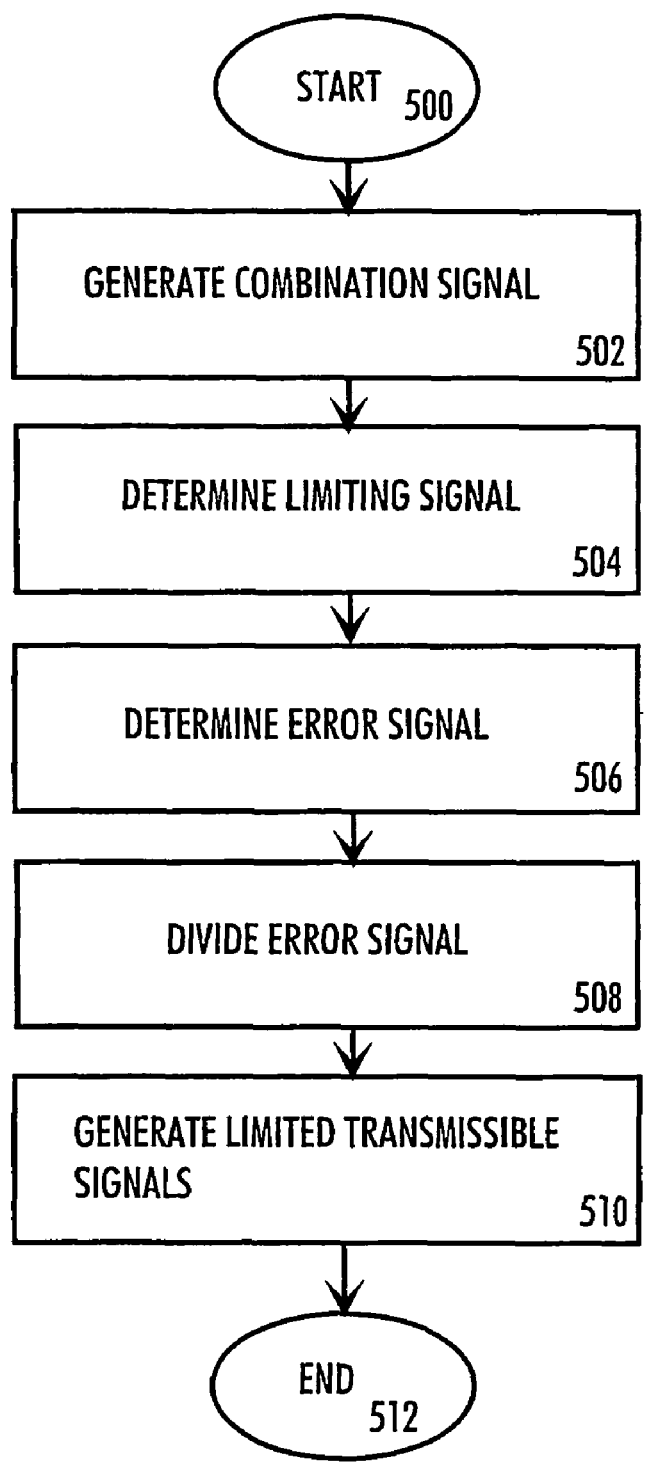
Figure 6:
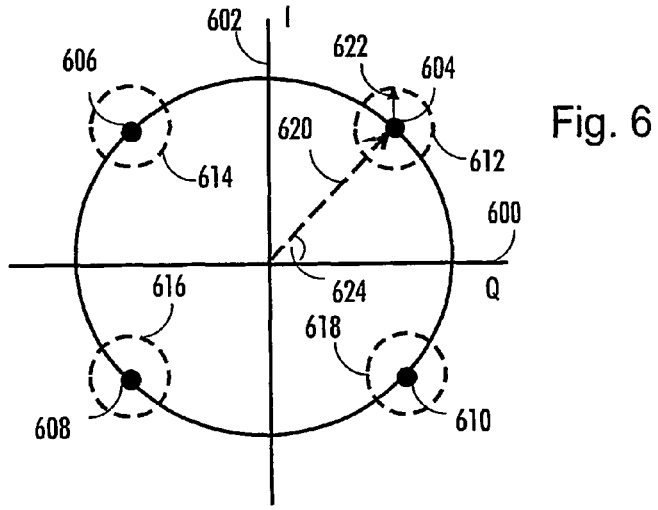
Figure 7:
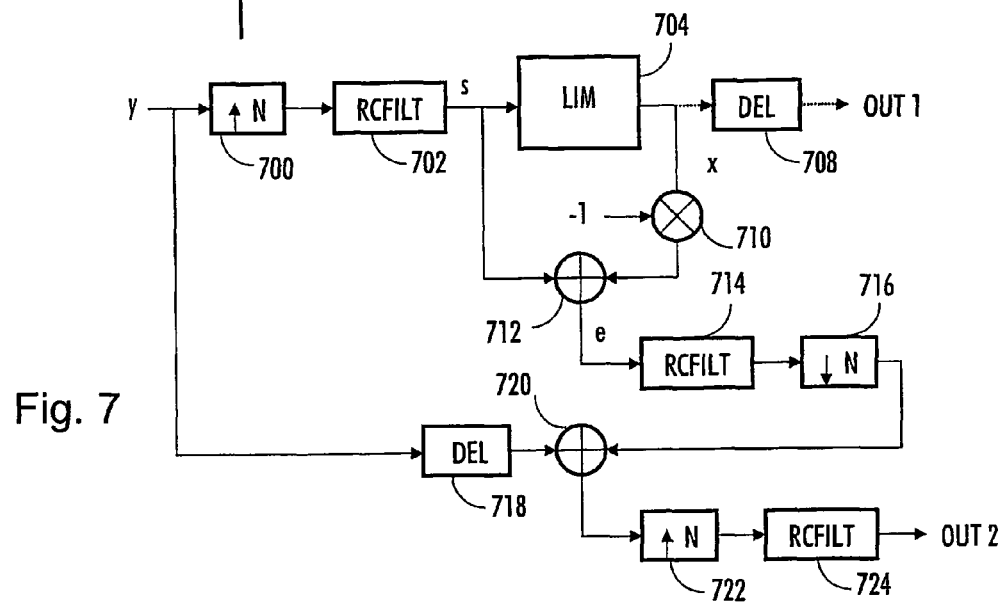
Figure 10:
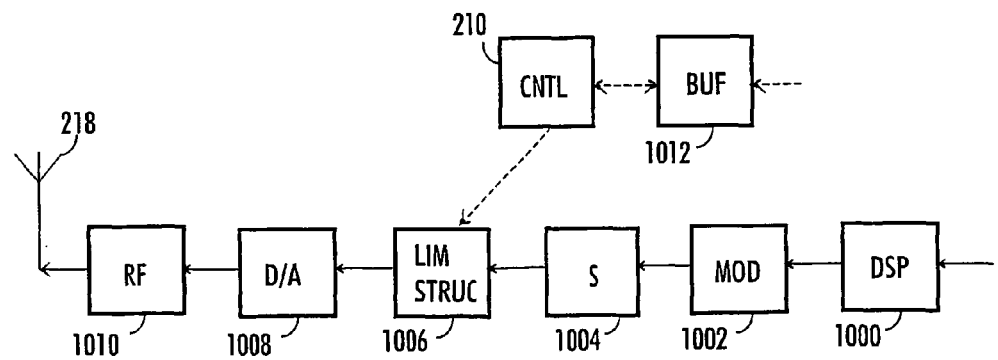
Figure 8:
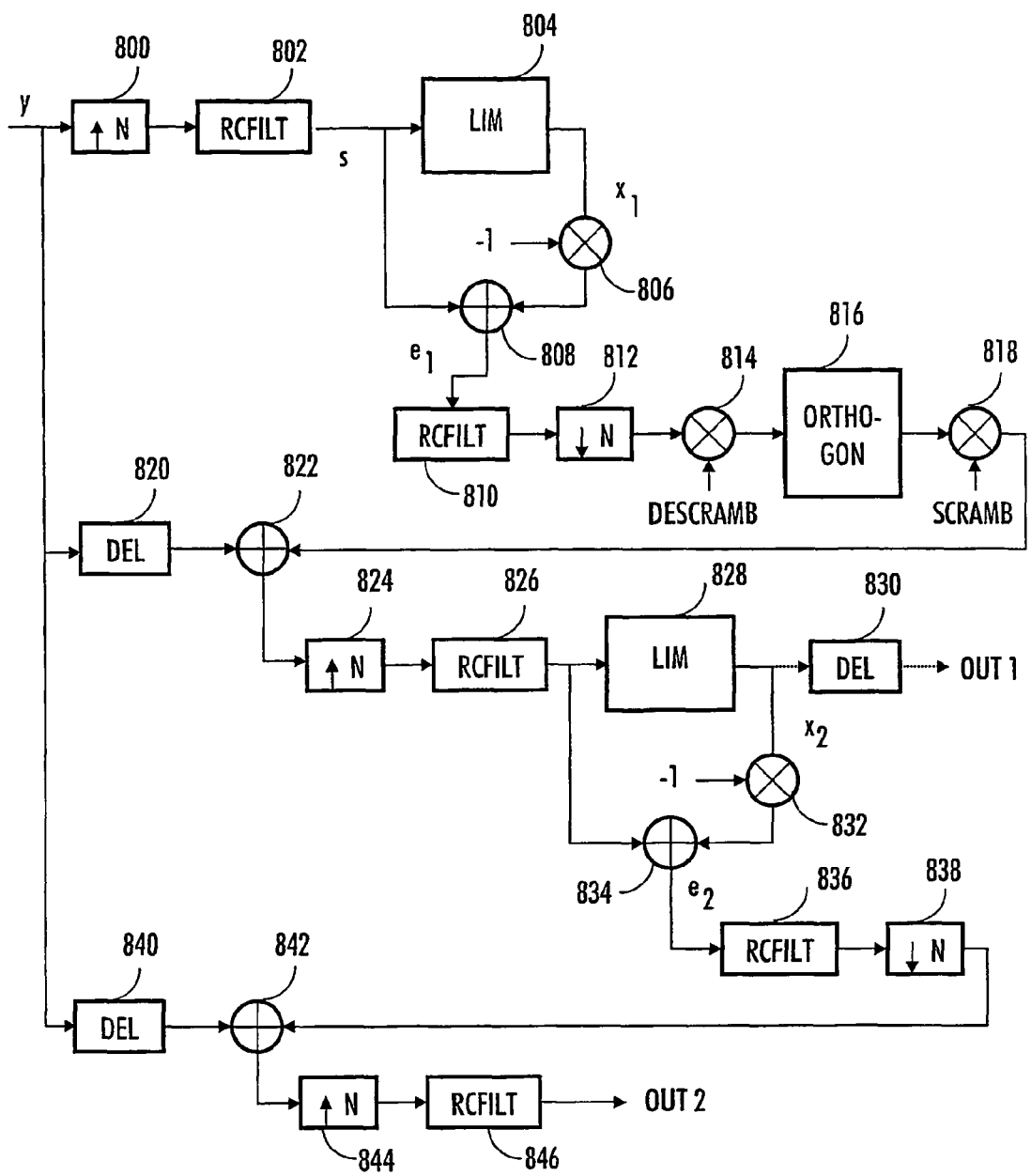
Figure 9:
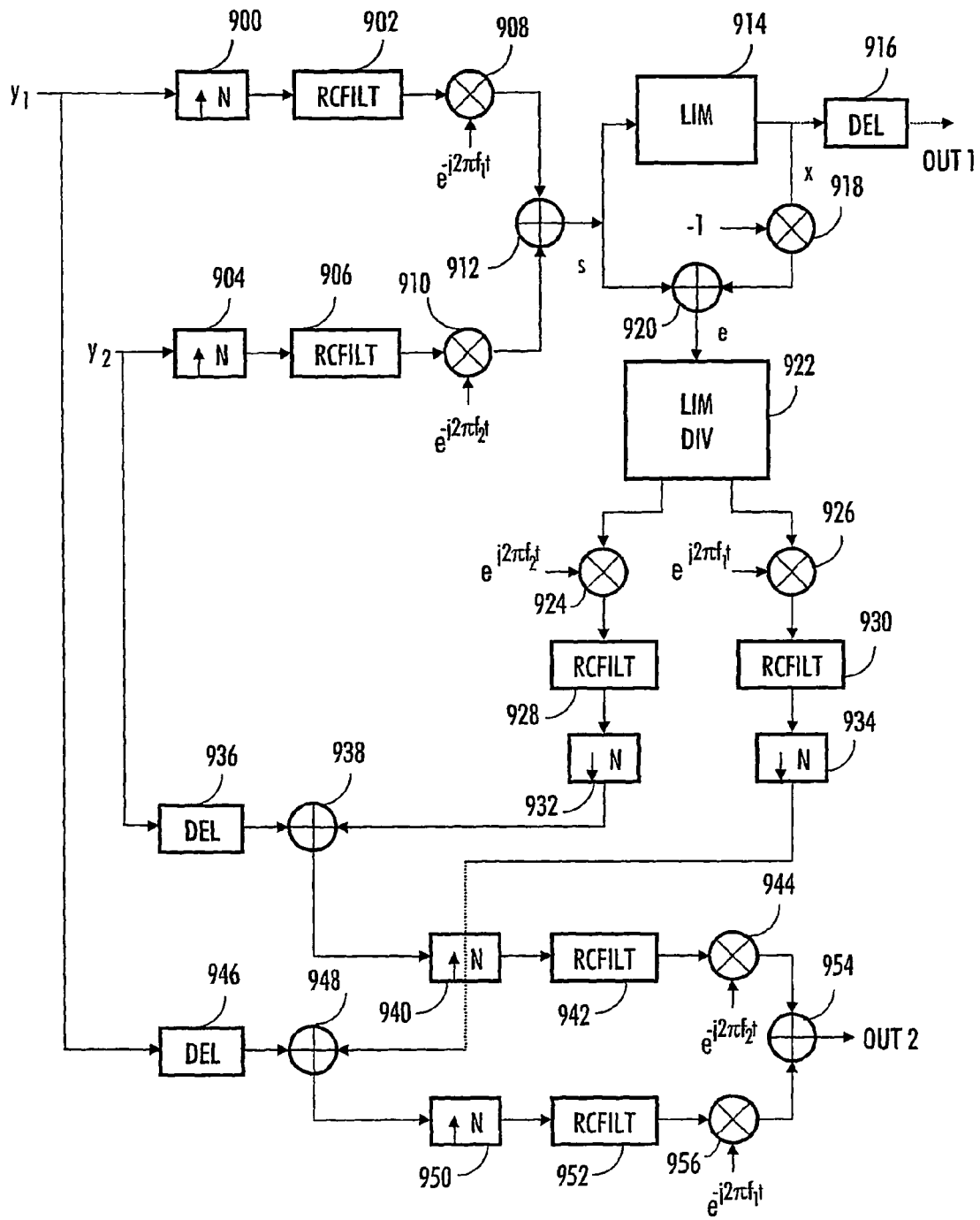

In the following the invention will be explained in greater detail by means of the preferred embodiments with reference to the accompanying drawings, in which FIG. 1 shows an example of a telecommunication system, FIG. 2 shows a second example of the telecommunication system, FIG. 3 shows a flow chart according to a first embodiment, FIG. 4 shows a flow chart according to a second embodiment, FIG. 5 shows a flow chart according to a third embodiment, FIG. 6 illustrates an error vector, FIG. 7 shows an example of a limiter structure, FIG. 8 shows a second example of the limiter structure, FIG. 9 shows a third example of the limiter structure, and FIG. 10 shows an example of a transmitter.

DESCRIPTION OF EMBODIMENTS

The solution according to the invention is particularly applicable to WCDMA (Wide Band Code Division Multiple Access) radio systems, in which Direct Sequence (DS) technique is employed. Other applications may include satellite systems, military telecommunications systems and individual non-cellular networks. However, the solution of the invention is not restricted thereto.

In the following, the preferred embodiments of the invention are described in the UMTS (Universal Mobile Telephone System) system without restricting the invention thereto.

With reference to FIG. 1, the structure of a mobile communication system is explained by way of example. The main parts of the mobile communication system are a core network CN, a UMTS terrestrial radio access network UTRAN and user equipment UE. The interface between the CN and the UTRAN is referred to as Iu, and the air interface between the UTRAN and the UE is referred to as Uu.

The UTRAN comprises radio network subsystems RNS. The interface between the RNSs is referred to as Iur. The RNS comprises a radio network controller RNC and one or more nodes B. The interface between the RNC and node B is referred to as Iub. The coverage area, or cell, of node B is marked with the letter C in the Figure.

The description shown in FIG. 1 is relatively general, and therefore a more detailed example of a cellular radio system is illustrated in FIG. 2. FIG. 2 comprises the most essential blocks only, but it is apparent for those skilled in the art that a conventional cellular radio system also includes other functions and structures, which need not be explained in more detail herein. In cellular radio systems, the details may differ from what is shown in FIG. 2, but these differences are not relevant for the invention.

A cellular radio network typically comprises a fixed network infrastructure, i.e. a network part 200, and user equipment 202, which may be fixedly located, vehicle-mounted or portable hand-held terminals, such as mobile phones or laptop computers, which may be used to communicate with a radio communication system. The network part 200 comprises base stations 204. The base station corresponds to node B shown in the previous Figure. Several base stations 204, in turn, are controlled in a centralized manner by a radio network controller 206 communicating therewith. The base station 204 comprises transceivers 208 and a multiplexer 212.

The base station 204 further comprises a control unit 210 controlling the operation of the transceivers 208 and the multiplexer 212. The multiplexer 212 arranges the traffic and control channels used by several transceivers 208 to a single transmission connection 214 that forms an interface Iub.

The transceivers 208 in the base station 204 are connected to an antenna unit 218, which is used for implementing a radio connection 216 to the user equipment 202. The structure of the frames to be transmitted on the radio connection 216 is defined separately in each system, and referred to as an air interface Uu.

The radio network controller 206 comprises a group switching field 220 and a control unit 222. The group switching field 220 is used for connecting speech and data and for combining signalling circuits. The base station 204 and the radio network controller 206 form a radio network subsystem 224, which further comprises a transcoder 226. The transcoder 226 is generally located as close to a mobile services switching centre 228 as possible, since speech can then be transferred in cellular radio network form between the transcoder 226 and the radio network controller 206, thus saving transmission capacity.

The transcoder 226 converts different digital speech coding forms used between a public switched telephone network and a radio network to be compatible. The control unit 222 performs call control, mobility management, collection of statistical data and signaling.

FIG. 2 also shows the mobile services switching centre 228 and a gateway mobile services switching centre 230, which handles the connections from the mobile communications system to the outside world, in this case to a public switched telephone network 232.

Next, in FIGS. 3, 4 and 5 the method for limiting a signal in a transmitter is described in more detail. A signal is limited in the method typically by clipping power or amplitude values. A preferred embodiment of the invention is described in the flow chart shown in FIG. 3. A second preferred embodiment of the method, in which orthogonalization of an error signal is also carried out in order to reduce correlation, i.e. interference caused to other users, is described in FIG. 4. A preferred embodiment of the invention that is applicable to multiple carrier systems is described in FIG. 5. What is typical for all preferred embodiments of the invention is that the need to limit the signal is determined from a signal filtered using a pulse shaping filter, whereby the effect of the pulse shaping filter should be considered, but the signal that is to be clipped is a non-filtered signal. Consequently, the ACLR (Adjacent Channel Leakage Power Ratio) is minimized. Pulse shaping filters are well known in the art, and are therefore not explained in more detail herein. As regards the pulse shaping filters, the main principle is that the frequencies outside the desired frequency band are filtered in order to reduce interference.

Carrying out a preferred embodiment of the method starts from block 300. A limiting signal is determined in block 302 from a transmissible signal filtered using a pulse shaping filter. Typically, the limiting signal is determined in such a manner that the signal comprises power or amplitude values, which are to be clipped from the transmissible signal in order to reach the object of the peak-to-average ratio. These values can be determined in various ways. A threshold value may for instance be set for the power or amplitude values. A number of system-specific matters may be considered when the threshold value is set, and examples thereof include a predetermined maximum value for an error vector magnitude, a predetermined maximum value for a peak code domain error or a desired Peak-to-Mean Ratio, Peak-to-Average Ratio, Crest factor of power or amplitude. If the transmissible signal does not have to be limited, the signal can be applied to other parts of the transmitter as such, typically to the RF parts.

Next in FIG. 6, the determination of an error vector magnitude is explained. A simple example of a signal space diagram is described in FIG. 6 that allows illustrating the location of the modulated symbols. The example describes a two-dimensional signal space diagram of a phase-modulated signal, when the modulation includes four levels. The system thus employs four different signals or pulse modes. In the example shown in FIG. 6, points 604, 606, 608, 610 describe different signals, or signal space diagram states. The signal is provided with a different phase module in the different states 604, 606, 608, 610 of the signal space diagram. The number of states in the signal space diagram varies depending on the modulation method; the greater the number of states the greater the data transmission capacity of the system. The signal space diagram can be shown in accordance with FIG. 6 as a circle of a unit, but other ways of illustrating also exist.

In the Figure, a quadrature component of a modulated signal is placed on the horizontal axis 600 and an in-phase component is placed on the vertical axis 602. Such a modulation method is concerned, in which a signal is divided into phase and quadrature components.

Circles 612, 614, 616, 618 describe an area, in which the signals representing different symbols owing to different kinds of interference are actually placed. The signal space diagram is formed in such a manner that the phasor diagrams of different signals provided with determined phase differences are placed in the same Figure. A phasor diagram 620 is shown in FIG. 6 describing the amplitude of a single signal. An angle 624 describes the phase difference of the signal. The phasor diagram shown for the signal is $A \cos(2\pi f_0 t + \phi)$, where A refers to the amplitude of the signal, $f_0$ to the average frequency, t to time and $\phi$ to the phase difference.

An arrow 622 describes a vector that represents the distance between the location of a signal that is free of interference and the actual location of the symbol. In the example shown in the Figure, interference is summed into the modulated signal. The vector 622 is referred to as an error vector magnitude (EVM). The error vector is an indicator of modulation quality according to the prior art.

An error signal is determined in block 304 using the transmissible signal and the limiting signal. The error signal is preferably determined so that the limiting signal determined in block 302 is reduced from the transmissible signal filtered using the pulse shaping filter.

Next, a limited transmissible signal is formed in block 306 by reducing the error signal filtered using the filter matched to a chip pulse waveform from an appropriately delayed transmissible signal. The transmissible signal is preferably delayed as much as the determination of the limiting signal and the required signal processing require. Filtering by means of the filter matched to the chip pulse waveform, the error signal could be restored to chip level. Different arranged filters are known for those skilled in the art and the way to implement the arranged filter is not relevant for the invention, and the filters will therefore not be explained in more detail herein. The excessive power or amplitude values have thus been removed from the limited transmissible signal. The obtained limited transmissible signal is then applied to the other parts of the transmitter.

Carrying out a preferred embodiment of the method ends in block 308. It should be noted that the limited signal, the error signal and the transmissible signal are preferably of baseband during the limitation.

The second preferred embodiment of the method is described in greater detail in FIG. 4. A signal comprising power or amplitude values to be clipped is orthogonalized in the method. In this application, such a signal is referred to as an error signal. The idea of orthogonalization is to reduce the peak-to-average-ratio. The method starts from block 400.

In block 402, a limiting signal is determined from the transmissible signal filtered using the pulse shaping filter. Typically, the limiting signal is determined in such a manner that the signal comprises power or amplitude values, which are to be clipped from the transmissible signal. These values can be determined in various ways. The power or amplitude values can for instance be provided with a threshold value. Several system-specific measures may be considered when setting the threshold value, such as a predetermined maximum value for an error vector magnitude, a predetermined maximum value for a peak code domain error or a desired peak-to-mean ratio, peak-to-average ratio, crest factor of power or amplitude. If the transmissible signal need not be limited, the signal can be applied to other parts of the transmitter as such, typically to the RF parts.

An error signal is determined in block 404 using the limiting signal and the transmissible signal. The error signal is preferably determined in such a manner that the limiting signal is reduced from the transmissible signal filtered using the pulse shaping filter.

In block 406, the error signal is orthogonalized. The object of orthogonalization is to reduce the peak-to-average-ratio. The error signal to be orthogonalized is an error signal filtered using the filter matched to the chip pulse waveform, since the error signal can thus be restored to chip level. Different arranged filters are known for those skilled in the art and the implementation of the filter to be arranged is not relevant for the invention, and the filters will therefore not be explained in more detail in this context.

The orthogonalization example shown here is appropriate to be used in a broadband direct sequence system, since the codes to be used for orthogonalization are spreading codes. Orthogonalization can be implemented in other systems too, whereby especially selected orthogonalization codes are employed in orthogonalization. The limiting signal is at least substantially a pseudo noise signal, or a random signal. Mathematically the random signal can be orthogonalized in accordance with prior art by minimizing the equation $$\left| [x_1 \ x_2 \ \ldots \ x_p] \begin{bmatrix} c_{1,1} & c_{2,1} & \cdots & c_{n,1} \\ c_{1,2} & c_{2,2} & \ddots & c_{n,2} \\ \vdots & \vdots & \ddots & \vdots \\ c_{1,p} & c_{2,p} & \cdots & c_{n,p} \end{bmatrix} - [y_1 \ y_2 \ \ldots \ y_n] \right|, \quad (1)$$

where $x_1, \ldots, x_p$ refer to symbols, which form a vector X to be minimized, p refers to the number of codes to be used in orthogonalization, $c_{1,1}, \ldots, c_{n,p}$ refer to spreading codes forming a code matrix C used in orthogonalization, n refers to the length of a code to be orthogonalized, and $y_1, \ldots, y_n$ refer to random signal samples forming a vector Y.

A least square estimate for X is indicated in the following form $$\hat{X} = (C^T C)^{-1} C^T Y. \quad (2)$$

where

C refers to a spreading code matrix,

T indicates the transpose of the matrix,

Y refers to a random signal vector.

Matrix C preferably consists of un-used spreading codes. Typically, spreading codes with the smallest possible cross correlation are to be selected for the system. Thus, the interference caused by different users to one another is minimized. If matrix C consists of un-used codes only, the orthogonalization does not cause any interference for other users.

It is generally known that the smaller the number of levels in the modulation method the greater the tolerance of interference. Then again, the transmission rate of the transmissible signal increases while the number of modulation method levels increases. It is therefore preferable to employ different modulation methods irrespective of the purpose of use. If various modulation methods are used in a radio system, meaning that for instance different modulation methods are employed for speech, slow or fast data connections, then codes allocated for a lower modulation level can be selected as the codes of matrix C.

For example, HSPA (High Speed Data Packet Access) endures poorly the clipping of signals. Then matrix C preferably consists of the codes, which have not been used for spreading HSDPA signals. The length n of the codes is set to correspond with the length of HSDPA codes.

Since the number of orthogonalizing codes is generally too small in practical systems and since the codes for different reasons are not completely non-correlating, the peak values of the transmissible signal must also be clipped in addition to orthogonalization in order to obtain the peak-to-average-ratio. Thus, a limited transmissible signal is generated in block 408 by reducing the orthogonalized error signal from an appropriately delayed transmissible signal. The transmissible signal is preferably delayed as much as the time the determination of the limiting signal and the required signal processing require. The obtained limited transmissible signal is then applied to the other parts of the transmitter.

The second preferred embodiment of the method ends in block 410. The second preferred embodiment of the method requires more processing and is therefore slower than the first one. The second embodiment is applicable to be used especially when the peak-to-mean-average, crest factor is provided with a strict limit. It should be noted that the limiting signal, the error signal and the transmissible signal are preferably of baseband during limitation.

The second preferred embodiment of the method can be further emphasized by adding a second clipping stage. Then in addition to the first determined error signal, a second limiting signal is determined in block 402 from the first limited transmissible signal filtered using the pulse shaping filter. Typically, the limiting signal is determined in such a manner that the signal comprises the power or amplitude values, which are to be clipped from the transmissible signal. These values can be determined in various ways. The power or amplitude values can for instance be provided with a threshold value. Several system-specific measures can be considered when setting the threshold value, such as a predetermined maximum value for an error vector magnitude, a predetermined maximum value for a peak code domain error or a desired peak-to-mean ratio, peak-to-average ratio, crest factor of the power or amplitude. If the transmissible signal need not be limited, the signal can be applied to other parts of the transmitter as such, typically to the RF parts.

A second error signal is determined in block 408 by means of the first limited transmissible signal and the second limiting signal. The error signal is preferably determined so that the second limiting signal is reduced from the first limited transmissible signal.

The second limited transmissible signal is generated by reducing the second error signal filtered using the filter matched to the chip pulse waveform from an appropriately delayed transmissible signal. The transmissible signal is delayed preferably as much as the time the determination of the limited signal and the required signal processing require. The error signal is restored to chip level by filtering it using the filter matched to the chip pulse waveform. Different arranged filters are known for those skilled in the art and the implementation of an arranged filter is not relevant for the invention, and the filters will therefore not be explained in more detail herein.

The second limited transmissible signal is filtered using the pulse shaping filter. The obtained limited transmissible signal is then applied to other parts of the transmitter, typically to the RF parts.

The addition of a second clipping stage naturally increases the processing time and is therefore usable when the clipping must fulfil particularly accurate conditions.

The preferred embodiment of the method to be described in the following is applicable to be used in multiple carrier systems. The preferred embodiment of the method starts from block 500. At least two signals modulated on different carriers are combined to a combination signal in block 502. The combination of signals is implemented in the prior art typically by adding together the signals modulated onto different carriers. Thus, a multicarrier transmitter is used as the radio transmitter. How the combination is carried out is not relevant for the invention, and is therefore not explained in more detail in this context.

In block 504, a limiting signal is determined from the combination signal filtered using the pulse shaping filter. Typically, the limiting signal is determined in such a manner that the signal comprises power or amplitude values, which are to be clipped from the combination signal. These values can be determined in various ways. The power or amplitude values may, for instance, be provided with a threshold value. Several system-specific measures may be considered when setting the threshold value, such as a predetermined maximum value for an error vector magnitude, a predetermined maximum value for a peak code domain error or a desired peak-to-mean ratio, peak-to-average ratio, crest factor of the power or amplitude. If the transmissible signal need not be limited, the signal can be applied to other parts of the transmitter as such, typically to the RF parts.

In block 506, an error signal is determined using the combination signal and the limiting signal. Preferably, the error signal is determined by reducing the limiting signal from the combination signal generated from the transmissible signals filtered using the pulse shaping filter.

In block 508, the error signal is divided onto different carriers in a predetermined manner. The division may be carried out, for instance, in such a manner that the error signal is divided equally to all carriers. The error signal may for instance also be divided onto different carriers so that more of the error signal is assigned to the carriers including most power or amplitude peaks. Different reasons for dividing exist and the appropriate one is selected according to the situation.

Next, in block 510 limited transmissible signals are generated by reducing each error signal filtered using the filter matched to the chip pulse waveform from a corresponding appropriately delayed transmissible signal. The limited transmissible signals are preferably determined so that the error signal is reduced from the appropriately delayed transmissible signal, i.e. from an ideal transmitted signal. The ideal transmitted signal is the signal, which would be received, if the transmissible signal were not to encounter errors on the radio channel. The transmissible signal is preferably delayed as much as the determination of the limiting signal and the required signal processing require. Each error signal is reduced from the transmissible signal that allows determining the error signal.

In this embodiment of the method, a combined limited transmissible signal can be generated by combining the limited transmissible signals for instance using a summer. Orthogonalization of the error signal can also be added to the preferred embodiment of the invention described herein. In a multiple carrier system, the signals are orthogonalized according to carriers, in other words after block 508.

The preferred embodiment of the method ends in block 512.

Next, the structure of a limiter is explained in FIG. 7, to which the preferred embodiment of the invention previously described in FIG. 3 can be applied. Symbol y indicates a transmissible signal, from which samples are taken in sampling means 700. A filter 702 is the pulse shaping filter, whose output signal is indicated with symbol s. The pulse shaped information signal samples s are fed into block 704, where amplitude or power values to be limited are searched. If no need for limitation occurs, the signal sample is delayed as much as the limiting processing requires in delay block 708 and is fed into output 1. if a need for limitation occurs, the part to be limited of the signal sample, or the part of the power or amplitude, which is too high (such a signal being referred to as a limiting signal herein) is changed so as to be of opposite sign in a multiplier 710 and reduced from the transmissible signal in a summer 712. Therefore, the error signal e is obtained using the formula $e=s-x$. The error signal is applied to the filter matched to the chip pulse waveform described in FIG. 7 by blocks 714 and 716. In block 714, the sampling frequency is reduced. The filters matched to the chip pulse waveform are generally known in the art, and they will therefore not be explained in more detail in this context.

The filtered error signal is reduced in a summer 720 from the transmissible signal delayed in block 718. The transmissible signal is delayed for the duration of the previously described processing. It should be noted that the transmissible signal arriving at the summer 720 is not pulse-shaped. Next, the limited transmissible signal is applied through a sampling block 722 and a pulse shaping filter 724 to other parts of the transmitter, mainly to the RF parts.

In the following, the structure of a limiter is explained in FIG. 8, to which the preferred embodiment of the invention previously described in FIG. 4 including a second clipping stage can be applied. It is apparent for those skilled in the art that such a structure can be simplified by removing the second clipping stage. The process is then accelerated. The structure that also includes a second clipping stage is particularly applicable to situations, in which specifically precise objectives are set for the limitation of the signal. Symbol y indicates the transmissible signal, from which samples are taken in sampling means 800. A filter 802 is the pulse shaping filter, whose output signal is indicated with symbol s. The pulse shaped information signal samples s are fed into block 804, where amplitude or power values to be limited are searched. The part to be limited of the signal sample, or the part of the power or amplitude, which is too high (such a signal being referred to as a limiting signal herein) is changed so as to be of opposite sign in a multiplier 806 and reduced from the transmissible signal in a summer 808. Therefore, the first error signal $e_1$ is obtained using the formula $e_1=s-x_1$. The first error signal is applied to the filter arranged into the chip described in FIG. 8 by blocks 810 and 812. In block 812, the sampling frequency is reduced. The filters matched to the chip pulse waveform are generally known in the art, and they will therefore not be explained in more detail in this context.

Next, the first error signal is applied to a multiplier 814, in which a scrambling code is removed from the signal by multiplying the signal by a complex conjugate of the scrambling code. Block 816 is an orthogonalization block, in which the first error signal is orthogonalized as shown in FIG. 4. The orthogonalized first error signal is multiplied by the scrambling code in a multiplier 818.

The orthogonalized first error signal is reduced in a summer 822 in block 830 from the delayed transmissible signal. The transmissible signal is delayed for the duration of the previously described processing. The first limited transmissible signal obtained as a result thereof is applied to a sampling block 824 to a pulse shaping filter 826.

Next, a second limiting signal and a second error signal are determined in blocks 828, 832 and 834. The second limiting signal and the second error signal are determined in a corresponding manner as the first limiting signal and the first error signal. If the desired peak-to-average-ratio is reached already with the first limited transmissible signal, i.e. no power or amplitude values to be clipped are found in block 828, then naturally neither the second limiting signal is determined nor the second error signal. Hence, the first limited transmissible signal is applied to a delay block 830, in which the signal is delayed for the time the second stage processing takes, and to output 1.

The second error signal is also filtered using the filter arranged into the chip described in blocks 836, 838. The filtered second error signal is reduced in a summer 842 from the delayed transmissible signal in block 840. The transmissible signal is delayed for the duration of the previously described processing. The obtained second limited transmissible signal is applied through a sampling block 844 and a pulse shaping filter 846 to output 2.

Next in FIG. 9, the structure of a limiter is explained, to which a preferred embodiment of the invention previously described in FIG. 5 can be applied. A third preferred embodiment of the method is applicable to multiple carrier systems. For clarity, the Figure shows only two different carriers $f_1$ and $f_2$. However, it is apparent for those skilled in the art that the number of carriers varies according to applications. In FIG. 9, the first transmissible signal is indicated with symbol $y_1$ and the second signal with symbol $y_2$. At first the transmissible signal $y_1$ is sampled in block 900 and filtered using a pulse shaping filter 902 and the transmissible signal $y_2$ is sampled in block 904 and filtered using a pulse shaping filter 906. Thereafter, both transmissible signals are up converted to intermediate frequencies by means of multipliers 908 and 910. The intermediate frequency transmissible signals are combined in a summer 912.

The actual limitation is carried out for a baseband pulse shaped combined transmissible signal s. Amplitude or power values to be limited are searched for in block 914. If no need for limitation occurs, the signal sample is delayed as long as the limitation process in delay block 916 takes, and is then fed to output 1. The part to be limited of the signal sample, i.e. the part of the power or amplitude that is too high (such a signal being referred to as a limiting signal, x, herein) is changed to a signal of opposite sign in a multiplier 918 and reduced from the signal transmitted in a summer 920. Consequently, the error signal e is obtained using the formula $e=s-x$.

In block 922, the error signal is divided onto different carriers, or different transmissible signals. The reasons for division are described above in FIG. 5. The divided error signals are down converted to baseband in multipliers 924, 926. The error signals are filtered using the filters matched to the chip pulse waveform illustrated in blocks 928, 932 and 930, 934.

The part of the error signal assigned to the transmissible signal of the first carrier is reduced from the first baseband transmissible signal in a summer 948. The first error signal is at first delayed for the duration of the processing time elapsed in delay block 946. The part assigned to the transmissible signal of the second carrier is reduced from the second baseband transmissible signal in a summer 938. The second error signal is at first delayed for the duration of the processing time elapsed in delay block 936. The limited transmissible signals are sampled in blocks 940, 950 and filtered by means of pulse shaping filters 942, 952. After this, the signals are up converted to an intermediate frequency in multipliers 944, 956. The intermediate limited and pulse shaped transmissible signals are summed for transmission in a summer 954 and are applied to output 2. If desired, the orthogonalization of the error signal is carried out in accordance with the carriers, in other words before the summers 938 and 948.

The invention is explained in the following with reference to FIG. 10, where for the sake of clarity a simplified example of the base station transmitter is illustrated by means of an embodiment in a block diagram. It is apparent for those skilled in the art that the transmitter may include other parts as well than only those that are described in connection with FIG. 10.

Signal-processing block 1000 describes the apparatus parts of the base station, which are required for generating speech or data in the transmitter. The information string, or signal, consisting of symbols, i.e. of one or more bits, is processed in different ways in the transmitter. Signal processing including for instance coding, is implemented in general in a DSP processor (DSP=Digital Signal Processing). If the transmission in the system is in frame form, and the frames comprising time slots, the frames are formed typically in the DSP processor, as well as the interleaving of symbols. Signal coding and interleaving aim to ensure that the information sent can be retrieved in the receiver, even if not all information bits could be received.

In block 1002, the signal is modulated using a desired modulation method. One or more modulation methods can be used depending upon the system. Speech and data may require, for instance, specific modulation methods. In modulation, the selected carrier is modulated using data in such manner that the desired carrier characteristics, frequency, amplitude and/or phase, transfer information on a radio channel. Modulation methods are described in literature relating to this particular field.

Block 1004 describes the multiplication carried out by a spreading code in direct sequence systems for the information to be transmitted, by which the narrowband signal is spread onto broadband. The limitation of the transmissible signal is carried out in block 1006 comprising one of the limiter structures described in FIG. 7, 8 or 9. Preferably, block 1006 is controlled by control block 210. The control block may be the same as the block controlling the operation of the entire base station. The control block and a buffer memory 1012 allow determining, for example, a threshold, and the power or amplitude values exceeding the threshold will be clipped. Block 1006 may also include several of the structures shown in FIGS. 7, 8 and 9, whereby the control block controls the choice of limiter structure. For example, if orthogonalization is required, the structure illustrated in FIG. 8 is selected, otherwise the structure shown in FIG. 7, for instance.

Converting the signal from digital mode into analogue mode is carried out in block 1008. In RF parts 1010, the signal is up converted to a selected transmission frequency, amplified and filtered, if necessary. An antenna 218 may be an individual antenna or a group antenna formed of several antenna elements.

The invention is preferably implemented by software, whereby the base station 204 typically comprises a microprocessor, in which the functions according to the method described are implemented as functional software. It is apparent for those skilled in the art that the functions according to the method for limiting the transmissible signal can be implemented also in a spread system, whereby for example the setting of a clipping threshold is carried out in the radio network controller and the clipping is performed in the base station. The invention can also be carried out for instance using an apparatus solution offering the required functionality, such as ASIC (application Specific Integrated Circuit) or utilizing separate logic components.

Even though the invention has above been described with reference to the example in the accompanying drawings, it is apparent that the invention is not restricted thereto but can be modified in various ways within the scope of the inventive idea disclosed in the attached claims.

The invention claimed is:

1. A method, comprising:
   determining, at a processor, a limiting signal from a signal filtered using a pulse shaping filter;
   determining an error signal using the signal and the limiting signal by changing the limiting signal so as to be of an opposite sign and reducing from the signal; and
   generating a limited signal by reducing an error signal filtered using a filter matched to a chip pulse waveform from the signal.

2. A method, comprising:
   determining, at a processor, a limiting signal from a signal filtered using a pulse shaping filter;
   determining an error signal using the signal and the limiting signal by changing the limiting signal so as to be of an opposite sign and reducing from the signal;
   orthogonalizing the error signal filtered using a filter matched to a chip pulse waveform; and
   generating a limited signal by reducing the orthogonalized error signal from the signal.

3. A method, comprising:
   combining, at a processor, at least two signals modulated on different carriers to a combination signal;
   determining a limiting signal from the combination signal filtered using a pulse shaping filter;
   determining an error signal using the combination signal and the limiting signal by changing the limiting signal so as to be of an opposite sign and reducing from the signal;
   dividing the error signal onto different carriers in a predetermined manner; and
   generating limited signals by reducing each error signal part filtered using a filter matched to a chip pulse waveform from a corresponding signal.

4. The method as claimed in claim 1, wherein the signal is a baseband signal.

5. The method as claimed in claim 1, wherein the limiting signal is a baseband signal.

6. The method as claimed in claim 1, wherein the error signal is a baseband signal.

7. The method as claimed in claim 1, wherein the limiting signal is determined using a threshold value set for power or amplitude values.

8. The method as claimed in claim 1, wherein the limiting signal is determined using a threshold value set for power or amplitude values, the threshold value being set bearing in mind the maximum value predetermined for an error vector magnitude.

9. The method as claimed in claim 1, wherein the limiting signal is determined using a threshold value set for power or amplitude values, the threshold value being set bearing in mind the maximum value predetermined for a peak code domain error.

10. The method as claimed in claim 1, wherein the limiting signal is determined using a threshold value set for power or amplitude values, the threshold value being set so as to obtain the desired peak-to-mean ratio, peak-to-average ratio, crest factor of the power or amplitude.

11. The method as claimed in claim 2, wherein a clipping stage is added.

12. The method as claimed in claim 2, wherein orthogonalization is carried out by minimizing the equation $$\left| [x_1 \ x_2 \ \ldots \ x_p] \begin{bmatrix} c_{1,1} & c_{2,1} & \cdots & c_{n,1} \\ c_{1,2} & c_{2,2} & \ddots & c_{n,2} \\ \vdots & \vdots & \ddots & \vdots \\ c_{1,p} & c_{2,p} & \cdots & c_{n,p} \end{bmatrix} - [y_1 \ y_2 \ \ldots \ y_n] \right|.$$

13. The method as claimed in claim 2, wherein the orthogonalizing the error signal utilizes unused codes.

14. The method as claimed in claim 2, wherein the orthogonalizing the error signal utilizes codes used at a lower modulation level.

15. The method as claimed in claim 3, wherein the dividing the error signal is carried out according to carriers.

16. The method as claimed in claim 3, wherein the error signal is divided equally between different carriers.

17. The method as claimed in claim 3, wherein the error signal is divided between different carriers in relation to power or amplitude values to be clipped.

18. An apparatus, comprising:
   means for determining a limiting signal from a signal filtered using a pulse shaping filter;
   means for determining an error signal using the signal and the limiting signal by changing the limiting signal so as to be of an opposite sign and reducing from the signal;
   means for generating a limited signal by reducing the error signal filtered using a filter matched to a chip pulse waveform from the signal; and
   means for filtering the limited signal using the pulse shaping filter.

19. An apparatus, comprising:
   means for determining a first limiting signal from a signal filtered using a pulse shaping filter;
   means for determining a first error signal using the signal and the first limiting signal;
   means for orthogonalizing the first error signal filtered using a filter matched to a chip pulse waveform;
   means for generating a first limited signal by reducing the orthogonalized first error signal from the signal;
   means for determining a second limiting signal from the first limited signal filtered using the pulse shaping filter;

means for determining a second error signal using the first limited signal and the second limiting signal;
means for generating a second limited signal by reducing the second error signal filtered using a filter matched to a chip pulse waveform from the signal; and
means for filtering the second limited signal using the pulse shaping filter.

20. An apparatus, comprising:
means for combining at least two signals modulated on different carriers to a combination signal;
means for determining a limiting signal from the combination signal filtered using a pulse shaping filter;
means for determining an error signal using the combination signal and the limiting signal;
means for dividing the error signal onto different carriers in a predetermined manner;
means for generating limited signals by reducing each error signal part filtered using a filter matched to a chip pulse waveform from a corresponding signal;
means for filtering the limited signals using the pulse shaping filter; and
means for generating a combined limited signal by combining the filtered limited signals.

21. An apparatus, comprising:
means for filtering signals modulated on different carriers using pulse shaping filters;
means for combining at least two filtered signals to a combination signal;
means for determining a limiting signal from the combination signal;
means for determining an error signal using the combination signal and the limiting signal;
means for dividing the error signal onto different carriers in a predetermined manner;
means for generating limited signals by reducing each error signal part filtered using a filter matched to a chip pulse waveform from a corresponding signal;
means for filtering the limited signals using the pulse shaping filter; and
means for generating a combined limited signal by combining the filtered limited signals.

22. An apparatus, comprising:
a limiting determiner configured to determine a limiting signal from a signal filtered using a pulse shaping filter;
an error determiner configured to determine an error signal using the signal and the limiting signal by changing the limiting signal so as to be of an opposite sign and reducing from the signal;
a generator configured to generate a limited signal by reducing the error signal filtered using a filter matched to a chip pulse waveform from the signal; and
a filter configured to filter the limited signal using the pulse shaping filter.

23. The apparatus as claimed in claim 22, wherein the signal is a baseband signal.

24. The apparatus as claimed in claim 22, wherein the limiting signal is a baseband signal.

25. The apparatus as claimed in claim 22, wherein the error signal is a baseband signal.

26. The apparatus as claimed in claim 22, wherein the limiting determiner is further configured to determine the limiting signal using a threshold value set for power or amplitude values.

27. The apparatus as claimed in claim 22, wherein the limiting determiner is further configured to determine the limiting signal using a threshold value set for power or amplitude values, the threshold value being set bearing in mind the maximum value predetermined for an error vector magnitude.

28. The apparatus as claimed in claim 22, wherein the limiting determiner is further configured to determine the limiting signal using a threshold value set for power or amplitude values, the threshold value being set bearing in mind the maximum value predetermined for a peak code domain error.

29. The apparatus as claimed in claim 22, wherein the limiting determiner is further configured to determine the limiting signal using a threshold value set for power or amplitude values, the threshold value being set so as to obtain the desired peak-to-mean ratio, peak-to-average ratio, crest factor of the power or amplitude.

30. An apparatus, comprising:
a first limiting determiner configured to determine a first limiting signal from a signal filtered using a pulse shaping filter;
a first error determiner configured to determine a first error signal using the signal and the first limiting signal;
a processor configured to orthogonalize the first error signal filtered using a filter matched to a chip pulse waveform;
a first generator configured to generate a first limited signal by reducing the orthogonalized first error signal from the signal;
a second limiting determiner configured to determine a second limiting signal from the first limited signal filtered using the pulse shaping filter;
a second error determiner configured to determine a second error signal using the first limited signal and the second limiting signal;
a second generator configured to generate a second limited signal by reducing the second error signal filtered using a filter matched to a chip pulse waveform from the signal; and
a filter configured to filter the second limited signal using the pulse shaping filter.

31. The apparatus as claimed in claim 30, wherein the processor is further configured to carry out the orthogonalization of the first error signal according to carriers.

32. An apparatus, comprising:
a combiner configured to combine at least two signals modulated on different carriers to a combination signal;
a limiting determiner configured to determine a limiting signal from the combination signal filtered using a pulse shaping filter;
an error determiner configured to determine an error signal using the combination signal and the limiting signal;
a divider configured to divide the error signal onto different carriers in a predetermined manner;
a first generator configured to generate limited signals by reducing each error signal part filtered using a filter matched to a chip pulse waveform from a corresponding signal;
a filter configured to filter the limited signals using the pulse shaping filter; and
a second generator configured to generate a combined limited signal by combining the filtered limited signals.

33. The apparatus as claimed in claim 32, wherein the divider is further configured to divide the error signal equally between different carriers.

34. The apparatus as claimed in claim 32, wherein the divider is further configured to divide the error signal between different carriers in relation to power or amplitude values to be clipped.

35. The apparatus as claimed in claim 30, wherein the processor is further configured to carry out orthogonalization by minimizing the equation $$\left| [x_1 \ x_2 \ \cdots \ x_p] \begin{bmatrix} c_{1,1} & c_{2,1} & \cdots & c_{n,1} \\ c_{1,2} & c_{2,2} & \ddots & c_{n,2} \\ \vdots & \vdots & \ddots & \vdots \\ c_{1,p} & c_{2,p} & \cdots & c_{n,p} \end{bmatrix} - [y_1 \ y_2 \ \cdots \ y_n] \right|.$$

36. The apparatus as claimed in claim 30, wherein the processor is further configured to carry out orthogonalization utilizing unused codes.

37. The apparatus as claimed in claim 30, wherein the processor is further configured to carry out orthogonalization utilizing codes used at a lower modulation level.

38. An apparatus, comprising:
a filter configured to filter signals modulated on different carriers using pulse shaping filters;
a combiner configured to combine at least two filtered signals to a combination signal;
a limiting determiner configured to determine a limiting signal from the combination signal;
an error determiner configured to determine an error signal using the combination signal and the limiting signal;
a divider configured to divide the error signal onto different carriers in a predetermined manner;
a first generator configured to generate limited signals by reducing each error signal part filtered using a filter matched to a chip pulse waveform from a corresponding signal;
a filter configured to filter the limited signals using the pulse shaping filter; and
a second generator configured to generate a combined limited signal by combining the filtered limited signals.

39. A non-transitory computer-readable medium encoded with a computer program, for controlling a processor to implement a method, the method comprising:
determining a limiting signal from a signal filtered using a pulse shaping filter;
determining an error signal using the signal and the limiting signal by changing the limiting signal so as to be of an opposite sign and reducing from the signal; and
generating a limited signal by reducing an error signal filtered using a filter matched to a chip pulse waveform from the signal.

40. A non-transitory computer-readable medium encoded with a computer program, for controlling a processor to implement a method, the method comprising:
determining a limiting signal from a signal filtered using a pulse shaping filter;
determining an error signal using the signal and the limiting signal by changing the limiting signal so as to be of an opposite sign and reducing from the signal;
orthogonalizing the error signal filtered using a filter matched to a chip pulse waveform; and
generating a limited signal by reducing the orthogonalized error signal from the signal.

41. A non-transitory computer-readable medium encoded with a computer program, for controlling a processor to implement a method, the method comprising:
combining at least two signals modulated on different carriers to a combination signal;
determining a limiting signal from the combination signal filtered using a pulse shaping filter;
determining an error signal using the combination signal and the limiting signal by changing the limiting signal so as to be of an opposite sign and reducing from the signal;
dividing the error signal onto different carriers in a predetermined manner; and
generating limited signals by reducing each error signal part filtered using a filter matched to a chip pulse waveform from a corresponding signal.

\* \* \* \* \*